May 25, 1965   J. M. BLANCHARD   3,185,446
LAMINATED STRUCTURES ADAPTED TO GENERATE SOUND-WAVES
AND/OR ULTRASONIC VIBRATION, NOTABLY FOR PRODUCING
VIBRATORY EFFECTS ALONG SURFACES
Filed Nov. 7, 1961                        5 Sheets-Sheet 1

INVENTOR.
JEAN MAURICE BLANCHARD
BY
Kenyon & Kenyon
ATTORNEYS

May 25, 1965 J. M. BLANCHARD 3,185,446
LAMINATED STRUCTURES ADAPTED TO GENERATE SOUND-WAVES
AND/OR ULTRASONIC VIBRATION, NOTABLY FOR PRODUCING
VIBRATORY EFFECTS ALONG SURFACES
Filed Nov. 7, 1961 5 Sheets-Sheet 3
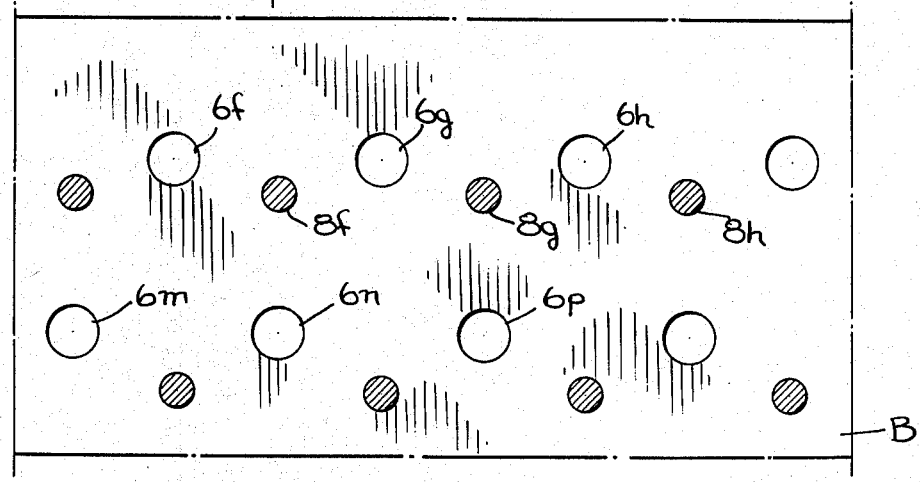
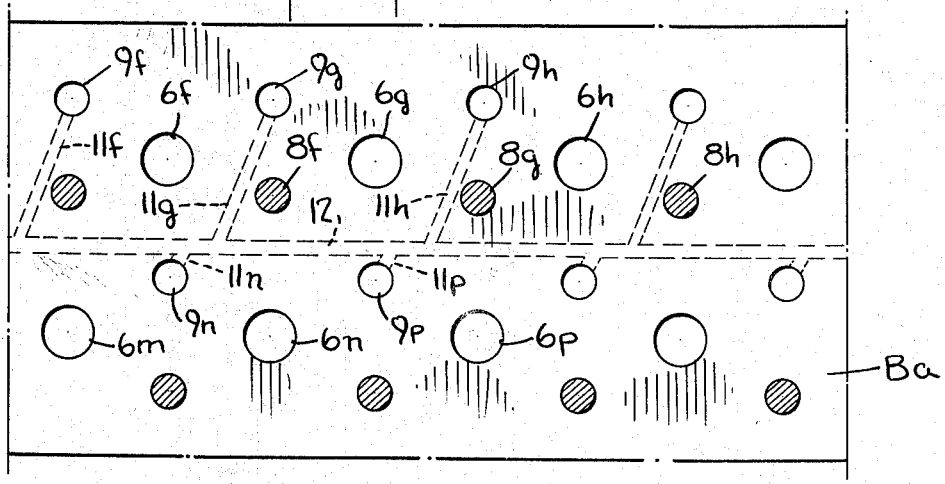
INVENTOR.
JEAN MAURICE BLANCHARD
BY
*Kenyon & Kenyon*
ATTORNEYS

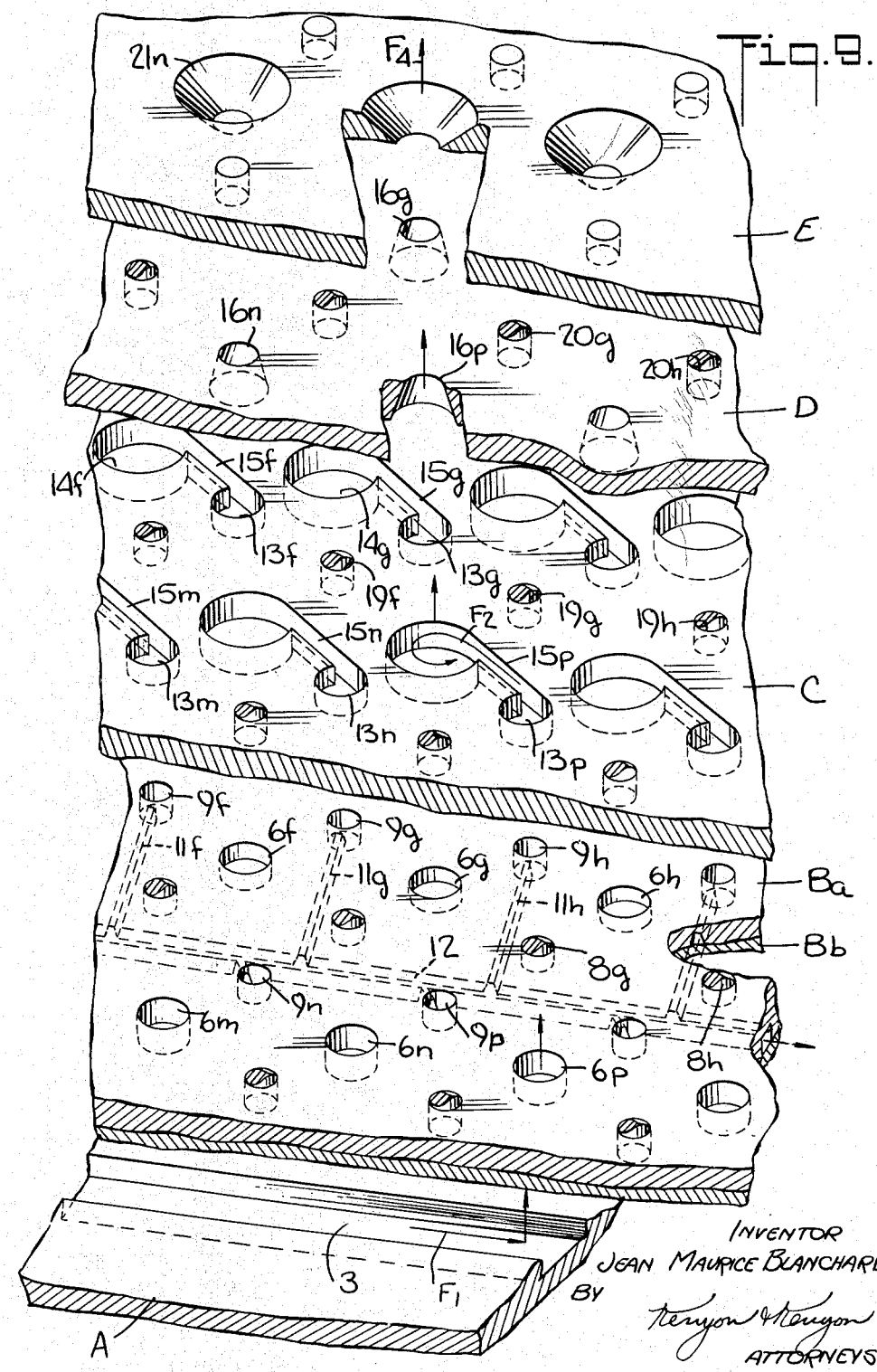

United States Patent Office 3,185,446
Patented May 25, 1965

3,185,446
LAMINATED STRUCTURES ADAPTED TO GENERATE SOUND-WAVES AND/OR ULTRASONIC VIBRATION, NOTABLY FOR PRODUCING VIBRATORY EFFECTS ALONG SURFACES
Jean Maurice Blanchard, Marseille, France, assignor, by mesne assignments, to Sirius, Luxembourg, Luxembourg, a corporation of Luxembourg
Filed Nov. 7, 1961, Ser. No. 150,708
6 Claims. (Cl. 259—1)

This invention is concerned with improvements in the laminated devices for generating sound-waves and/or ultra-sonic vibration, notably of the type described and illustrated in the U.S. Patent 3,071,145, dated January 1, 1963 (application Ser. No. 777,523 filed on December 1, 1958), for: "Sonic and Ultra-Sonic Vibration Generators." The improved devices disclosed in the present invention aim primarily but not exclusively at producing vibratory effects along predetermined surfaces, notably along plane surfaces, for example, in order to carry out the commercial treatment of flat objects by means of sound-waves and/or ultrasonic vibration fields, these objects being displaced or not with respect to the vibration generator during the treatment. However, this invention is applicable to other processes, for example to the production of vibrating zones or fields within an enclosure in which the vibration generators are placed.

In the aforesaid U.S. patent, it is proposed to provide apparatus for generating sound-waves and/or ultrasonic vibration, which consist of a stacking of thin sheets not necessarily of the same nature, said sheets having apertures, openings, recesses or cutout means constituting cavities of special configuration in which a fluid is circulated. Thus, this fluid is subjected to interferences caused by effects pertaining to the type of those produced by whistles. These interferences generate sound-waves and/or ultrasonic vibration utilized as a function of the specific applications contemplated.

However, in the specific examples of applications described in said U.S. patent, the vibration was produced with a view more particularly to utilize same either within the various laminated structures proposed, or along geometric axes of radiation of the vibration.

It is the essential object of this invention to provide laminated structures of the type broadly set forth hereinabove, capable of producing vibratory radiations having effects adapted to propagate through the whole of predetermined surfaces disposed externally of the generating devices themselves.

The invention consists essentially in constituting a generator of sound-waves and/or supersonic vibration which comprises a stacking of sheets, plates or the like, flat or not, in which passages, ducts or cutout openings are formed for circulating at least one fluid subjected to or producing interferences adapted to generate useful vibration, by forming a stacking comprising on the one hand a first portion consisting of one, two or more sheets or the like, formed with inner ducts or openings, wherein at least one fluid circulates along the mean plane or surface of each sheet concerned, and on the other hand another portion consisting of one, two or more other sheets or the like, also formed with inner ducts or openings, the same fluid or fluids circulating in each duct or opening in mean directions inclined with respect to the mean surface of the indentation concerned by an angle greater than 45°. These directions may advantageously be substantially perpendicular to said mean surface.

Preferably, said sheet or sheets of the last-named group or portion have a thickness sufficient to cause the contour of at least some of the cavities concerned to widen in one and/or the other mean direction of flow of the fluid circulating therethrough, notably with a view to increase the velocity of flow of the fluid, or for expanding or diffusing this fluid.

In addition to the general arrangement set forth hereinabove, the present invention further comprises other arrangements to be used preferably simultaneously. These additional arrangements will appear from the complementary description to be made presently, but the following examples may be cited more particularly:

A second arrangement, consisting in providing a generator of sound-waves and/or ultra-sonic vibration, which comprises a stacking of sheets or plates in which ducts, openings or the like are formed for circulating at least one fluid subjected to or producing therein interferences adapted to generate vibration, by causing said vibration to radiate outside the device from a so-called "terminal" sheet or plate constituting a radiation face or surface, the openings formed in said terminal sheet being more than five in number and separated or insulated from one another, each opening receiving therethrough the vibratory beam in a direction inclined by at least 45° in relation to the mean plane of each opening concerned. Preferably, in addition, at the outer surface of said terminal sheet the sum of the areas of the radiating openings is greater than 25% of the total aggregate useful surface of said sheet.

A third arrangement consists in incorporating in the laminated structure at least one sheet, plate or the like comprising recesses or the like connected to a circulation system and adapted to produce a suction toward the centre of at least some of the recesses formed in other sheets of the device, wherein interferences are generated and constitute at least one of the causes of the vibratory effects obtained.

This invention is also concerned more particularly with specific applications and embodiments to be described hereinafter with reference to the accompanying drawings, and still more particularly, by way of novel industrial products, with laminated devices of the type set forth hereinabove, involving the application of the above-listed arrangements, as well as with the special elements (notably the sheets, plates or the like) necessary for their construction, and finally with the assemblies incorporating such laminated structures.

The invention will be better understood from the following description of a few specific embodiments illustrated in the accompanying drawings and given by way of example only. In the drawings.

Figure 1:
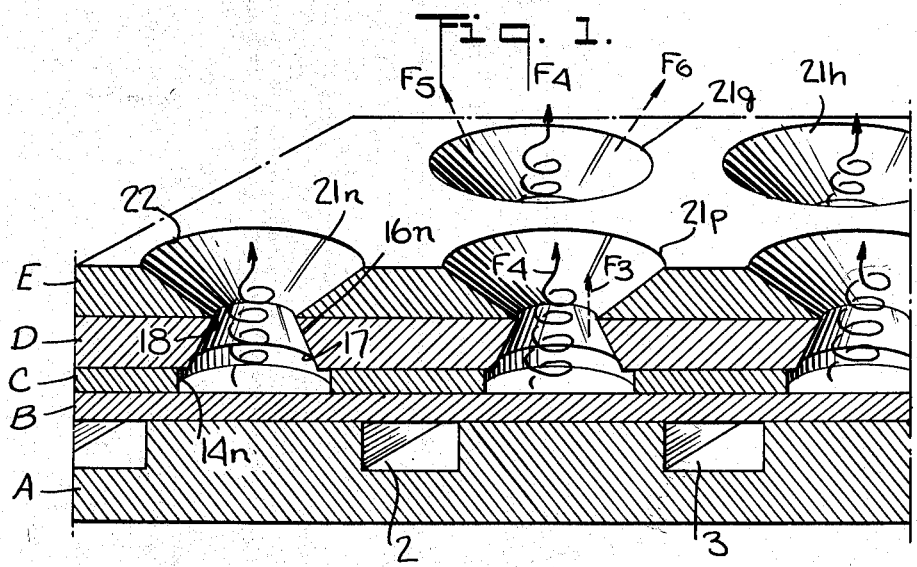
FIGURE 1 is a diagrammatic, part-sectional and partly perspective view showing a first embodiment of a vibration generator constructed according to the teachings of this invention.
Figures 3, 4:
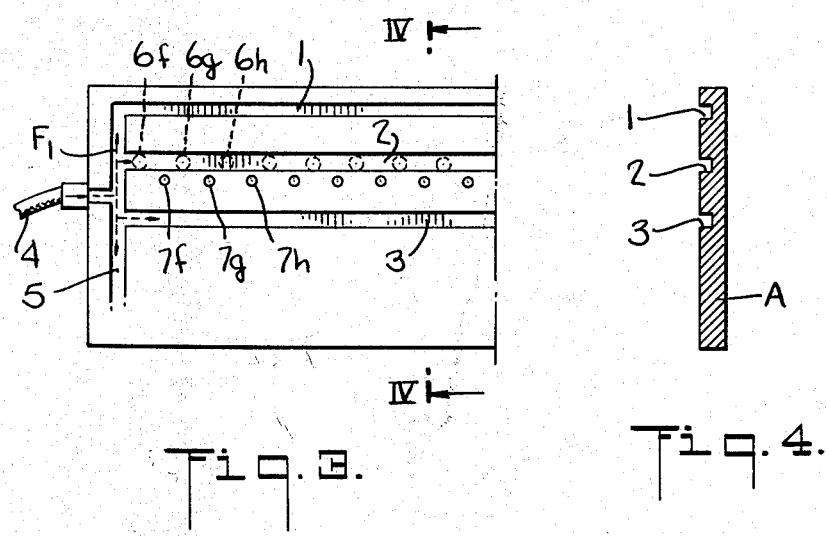
Figure 2:
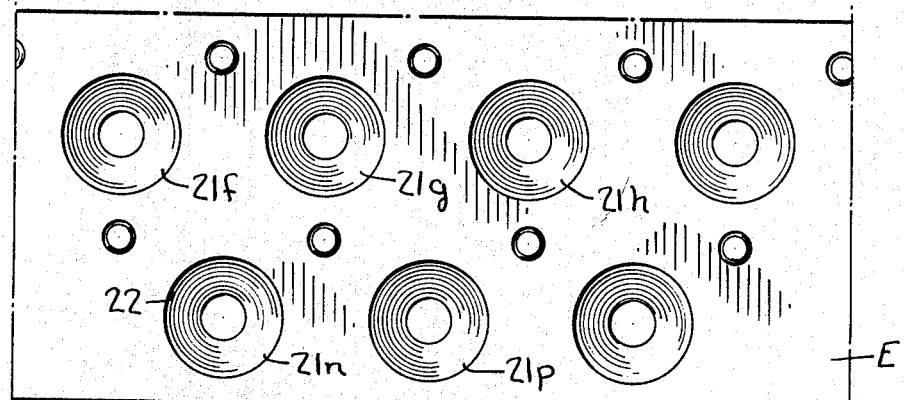
FIGURE 2 is a fragmentary view showing the same device in plan view from above.
Figure 7:
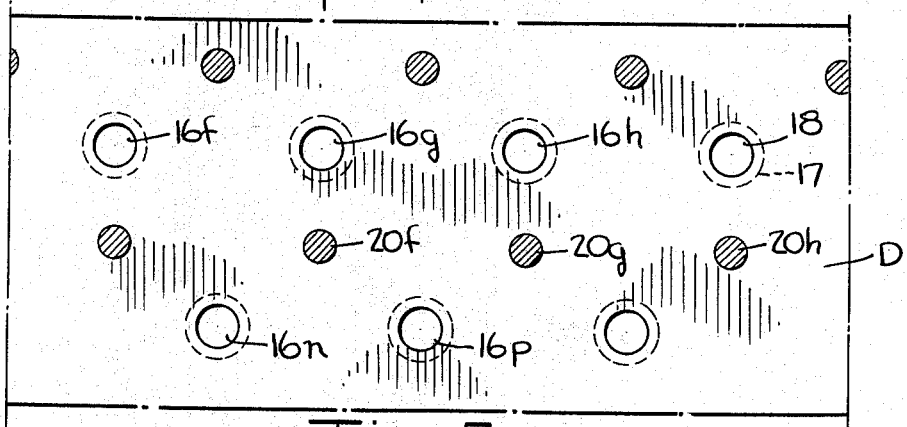
Figure 6:
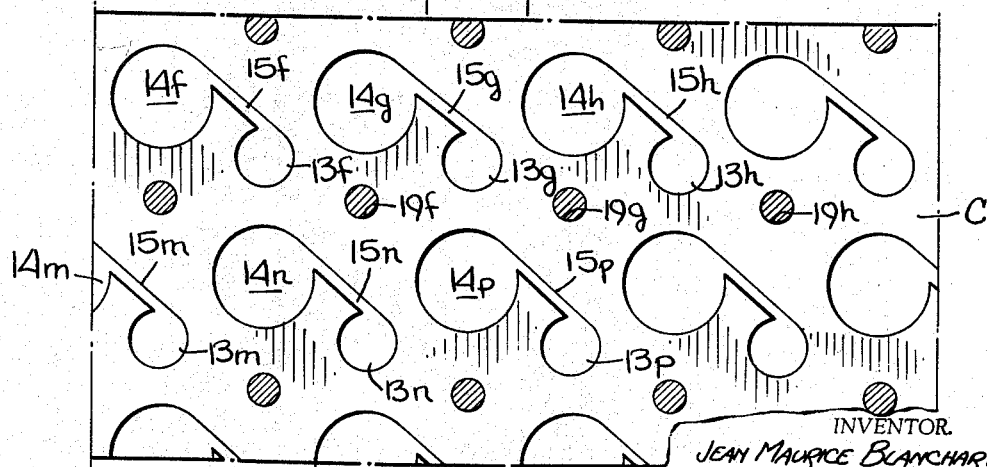
Figure 8:
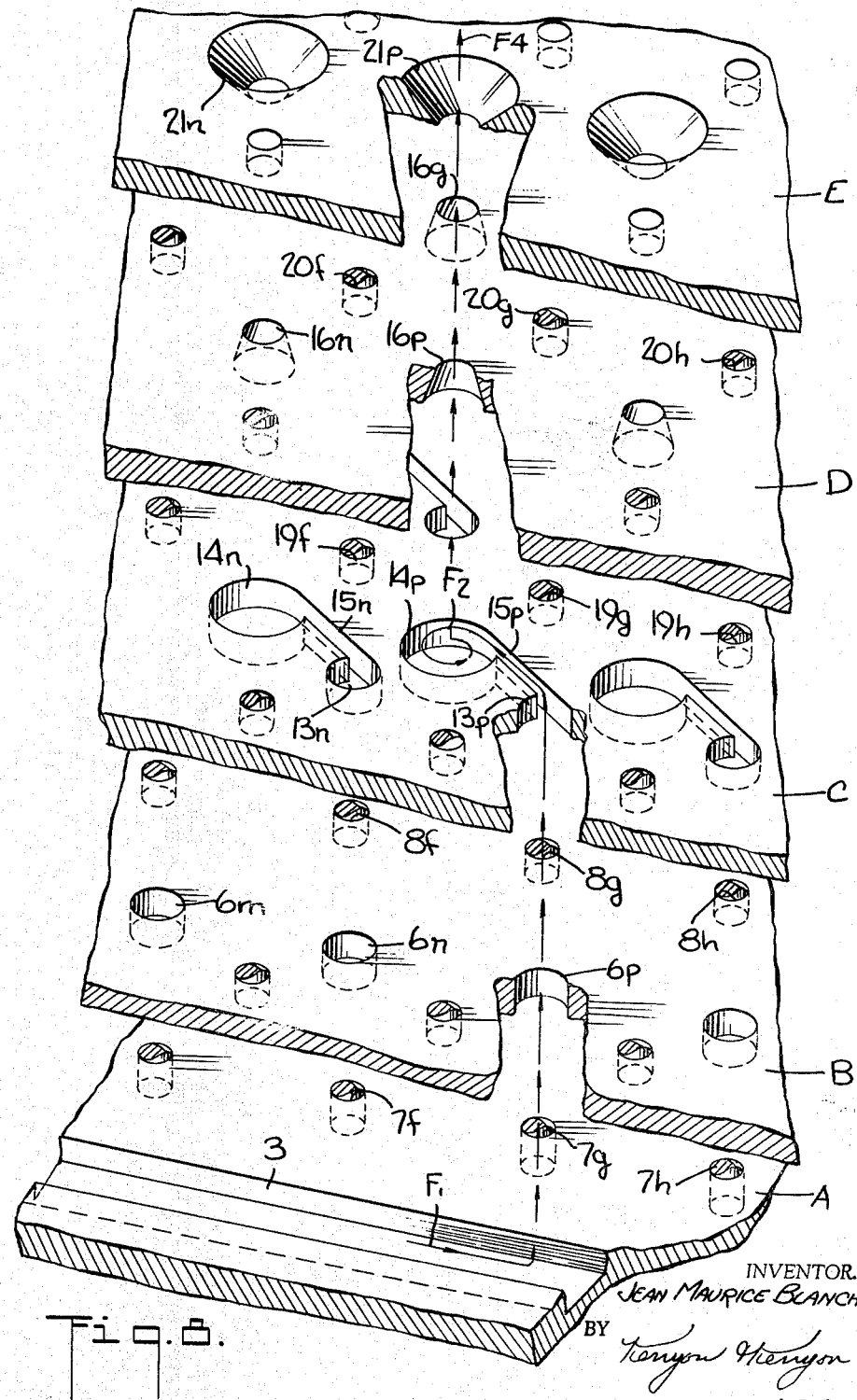

FIGURES 3 and 4 are respectively a plan view and a section taken upon the line IV—IV of FIGURE 3, showing one fraction of the lower plate of the same device; and FIG. 5a shows in plan view the plate B of the device of FIG. 1; FIG. 5b shows in plan view a suction plate Ba inserted in a device according to another embodiment; FIGS. 6 and 7 are plan views showing plates D and C respectively of FIG. 1; FIGS. 8 and 9 respectively are perspective exploded views of the embodiment according to FIG. 1 and to said other embodiment comprising use of the suction plate Ba of FIG. 5b.

Of course, these figures and their description in the specification should not be construed as limiting the invention. On the other hand, in order to avoid overburdening the disclosure the elements hereinabove termed "sheets, plates or the like" will be designated hereinafter conventionally by the term "plate" alone, it being understood that in the various possible embodiments of the present invention, on the one hand the mean surface of these plates is not compulsorily a plane, and on the other hand, at least some of these plates may be thin enough to correspond more to sheets than to plates. Moreover, these plates may be plane or have any other suitable configuration, for example cylindrical, conical or otherwise.

In the specific forms of embodiment illustrated in the figures the laminated structure comprises essentially five superposed plates designated by the reference letters A to E. However, it is obvious that in other forms of embodiment the structures of some of these plates may be merged into a single one; for example, in the case of plates A and B; on the other hand, some of these plates may be dispensed with, for example plate B and/or plate E.

Two aspects of plate A, which may be considered as the "base plate" of the device, are illustrated in FIGURES 3 and 4. This plate is formed with channels 1, 2, 3 for directing fluid towards the recesses of the other plates of the vibration generator. These channels 1, 2, 3 are fed from an outer pipe line 4 through a common manifold 5. The general directions of flow of the fluid are shown by the arrows $F_1$. On the other hand, FIGURE 4 shows that unlike the other plates of the device the channels such as 1, 2, 3 and the manifold such as 5 are not formed through and through the plate A but constitute grooves therein. The circles 6f, 6g, 6h (in dotted lines) show the position of the openings of plate B which are designated by the same reference symbols, in relation to the feed channel 2. On the other hand, on the same plate A of FIGURE 3 there is shown the relative position of holes such as 7f, 7g, 7h for assembling the superposed plates A to E with one another by means of bolts, threaded rods or the like, to constitute the device. Considering the arrangement of FIGURE 1, there is placed above plate A shown only partially in FIGURE 3 a plate B of which one fraction is shown on a larger scale in FIGURE 5a.

In this figure there is shown a first row of openings 6f, 6g, 6h . . . through which the generator fluid from line 4 and channel 2 in base plate A flows in a mean direction at least substantially perpendicular to the plane of FIGURE 5a, and a second row of similar openings 6m, 6n, 6p . . . disposed preferably at stepped intervals in relation to the aforesaid openings 6f, 6g, 6h . . . of the adjacent row. There are also shown holes such as 8f, 8g, 8h . . . which are axially aligned with the holes 7f, 7g, 7h . . . of base plate A and which, like these last-named holes, permit the relative assembling of the superposed plates A to E.

Above the plate B thus formed is a third plate C shown in section in FIGURE 1 and in detailed plan view in FIGURE 6.

This plate C comprises essentially openings each consisting of two recesses 13f–14f, 13g–14g, 13h–14h, 13m–14m, etc. interconnected by pairs through a short duct 15f–15g–15h–15m etc. In the device consisting of the stacked plates A to E each recess 13f–13g–13h–13m etc. of plate C is located respectively above a corresponding cavity 6f–6g–6h–6m etc. . . . (FIGURE 5a) of plate B. Thus, each cavity 13f–13g–13h–13m etc. receives the fluid having just passed through the plate B in the relevant cavities. However, plate D disposed above plate C (see FIGURES 1, 6 and 7) is not formed with openings or recesses in alignment with cavities 13f–13g–13h–13m etc. of said plate C. As a result, the fluid flowing into cavities 13f–13g–13h–13m etc. of plate C begins to circulate in the mean plane of this plate through channels 15f–15g–15h–15m etc. towards cavities 14f–14g–14h–14m etc. in the manner exemplified by the arrow $F_2$. In these last-named cavities 14 the fluid delivered from a substantially tangential channel 15 receives an approximately circular or spiral motion whereby interferences result which, provided that the fluid speed and pressure are sufficiently high, produce sound and/or ultrasonic vibration. In fact, the fluid which is delivered into cavity 14 by duct 15 circulates in said cavity 14 along a circuitous flowpath intersecting itself substantially at the point of delivery; it results therefrom that vibration is generated in the fluid as in any whistle-type generator. This vibration is then directed to the outside of the device with a mean displacement which is subsequently re-directed in directions either inclined with respect to the plane of plate C or substantially perpendicular thereto. In the embodiment exemplified in the drawing this function is devolved to plates D and E which are substantially similar to each other.

FIGURE 7 illustrates in plan view one fraction of plate D. This plate is somewhat thicker than plates B and C and is formed with openings 16f–16g–16h–16m–16n–16p etc. which, in the stacking of plates A to E, are in alignment with cavities 14f, 14g, 14h . . . 14m, 14n, 14p etc. of plate C. Said openings 16 on the other hand have a cross-sectional area decreasing gradually in the mean direction $F_3$ (FIGURE 1) in which the fluid already subjected to vibration is caused to flow; therefore, the velocity of flow of this fluid is increased, thus tending to reinforce said vibration. The reference numeral 17 designates the greater circle of openings 16, and reference numeral 18 designates their smaller circle. On the other hand, it will be seen that preferably the diameter of circle 17 is smaller than that of cavities 14 formed in plate C. This difference in diameter promotes greatly the generation of vibratory interferences in cavities 14.

Finally, it will be seen that holes 20f–20g–20h etc. are provided on this plate D for assembling the plates with one another in conjunction with holes 19f–19g–19h . . . 19m–19n, in plate C, and also with holes 8 of plate B and 7 of plate A.

Overlying the plate D is another plate E constituting the "terminal plate" of the device, that is, the plate having the openings through which the sound-waves and/or the ultrasonic vibration are radiated to the outside. This plate E (FIGURE 1) is similar to plate D except that its frustoconical openings 21g–21h . . . 21m–21n etc. formed therein having their larger diameter on the top or outer face. This flared configuration is advantageous for expanding the vibration-carrying fluid and also for causing the sum of the geometrical outer surfaces of these openings to be equal to a relatively important fraction (notably exceeding 25%) of the useful surface of said plate. Advantageously, the contour of each opening is circular and the larger diameter 22 of these circular openings is greater than the larger diameter 17 of openings 16 formed in plate D. Thus, the elementary vibratory beams $F_4$–$F_5$–$F_6$ radiated through each opening 21 are spread to a considerable degree, whereby vibratory effects can be obtained on the whole or at least on 80 percent of the geometrical surfaces externally of the terminal plate or sheet such as E, and mostly parallel thereto. This feature may be very interesting and valuable for applying treatments on a commercial scale by means of soundwaves and/or ultrasonic vibration.

This vibration generator may also incorporate various improvements. One of these, which may also be of great interest, is a system for producing a partial suction centrally of at least some of the cavities or openings in which the fluid interferences are effected for generating the desired vibration. This suction may be obtained most advantageously by providing at least one additional special plate, adequately designed and disposed in the plate stacking constituting the generator. This extra plate designated by the reference numeral Ba has been shown in plan view in FIG. 5b. FIG. 9 shows a vibration generator incorporating said plate. When considering this FIG. 9 (and FIG. 5b), it appears that plate Ba is provided with openings 9f–9g–9h–9n–9p etc. and groove ducts 11f–11g–11h–11n–11p and 12 in its lower surface. This auxiliary plate Ba is located between the plate C and a plate Bb which is similar in all respects to plate B of the embodiment shown in FIG. 8 (and FIG. 1). The groove ducts 12 are connected to suction means and to the ducts 11f–11g–11h–11n–11p etc., which communicate with the respective openings 9f . . . 9p etc. These openings 9f . . . 9p etc. are so positioned that, in the stack, they lie substantially centrally of the openings 14f etc. The diameter of these openings 9f . . . 9p etc. is smaller than that of openings 14f etc. for example, in the ratio of about 1/3 to 1/4 between these two diameters.

Said plate Bb thus prevents the intermingling of the fluids circulating in the groove ducts 11f . . . 11p etc. and 12 and openings 9f . . . 9p etc. and in the channels 1-2-3 of base plate A. The suction is produced through any suitable and known external means, in a tempered or mode-rate manner with the sole purpose of avoiding the formation or maintenance, centrally of the cavities or openings 14 of plate C, of a local overpressure fluid core likely to interfere or retard the circulation of fluid or to reduce the force of the aforesaid interferences. But it is clear that this suction should be effective upon only one fraction of the fluid delivered to said openings 14, so that another, substantial fraction of this fluid actually escapes through the openings of plates such as D and E in order to transfer the vibration generated therein to the outside, according to the essential scope of the device.

Therefore, irrespective of the form of embodiment utilized, novel laminated structures will be obtained which are capable of generating sound and/or ultrasonic vibration. These devices are characterized by marked advantages such as notably their sturdiness, the facility with which they can be embodied on a commercial scale, the flexibility with which they can be adapted to many different problems or circumstances, without appreciably increasing the machining operations normally contemplated; and, finally, the practical value of the systems and devices thus constructed, notably for directing sheets of sound-waves and/or ultrasonic vibration toward predetermined surfaces disposed at a more or less great proximity of a terminal or end plate or sheet of the device. This laminated structure according to the present invention is susceptible of many different and useful commercial applications.

As will be readily understood from the foregoing, this invention is not limited to the specific forms of embodiment, typical applications and construction of parts contemplated more particularly hereinabove and shown in the appended drawing. On the contrary, this invention is also concerned with all the various embodiments, notably, in addition to those already set forth hereinabove, the structures wherein at least some of the cavities (which in all the above-described embodiments have a circular configuration such as cavities 13 and 14 of plate C, FIGURE 6) have a general contour other than circular, for example oval, or formed with certain angles.

What I claim is:

1. In a pressure fluid operated whistle type vibration generator, a plurality of stacked plate means comprising first and second end plate means and intermediate plate means therebetween, said intermediate plate means being formed with openings therethrough, each of said openings comprising intercommunicating inlet and outlet portions and defining separate closed-loop flowpaths, each of said flowpaths intersecting itself at least at one point, a plurality of inlet means in said first end plate means each communicating with one of said inlet portions, a plurality of outlet means in said second end plate means each communicating with one of said outlet portions.

2. A vibration generator as claimed in claim 1, wherein said first end plate means comprise two laminae, one of which is applied against said intermediate plate means, groove means in the surface of one of said laminae adjacent to the other lamina, passages formed in said lamina which is applied against said intermediate plate means to connect said groove means and said inlet portion, said groove means being further connected to the source of said pressure fluid.

3. A vibration generator as claimed in claim 1, wherein said outlet means in said second end plate means are formed with a throat portion.

4. A vibration generator as claimed in claim 3, wherein said second end plate means consist of two laminae, each of said laminae being formed with frustoconical through-openings registering at their smaller bases.

5. A vibration generator as claimed in claim 1, wherein at least one auxiliary plate is provided between said first end plate means and said intermediate plate means, said auxiliary plate being formed with duct means each connected to one of said outlet portions and to a suction means for said fluid respectively.

6. In a pressure fluid operated whistle type vibration generator, a plurality of stacked plate means comprising first and second end plate means and intermediate plate means therebetween, said intermediate plate means being formed with openings therethrough, each of said openings comprising intercommunicating inlet and outlet portions and defining separate closed-loop flowpaths, each of said flowpaths intersecting itself at least at one point, a plurality of inlet means in said first end plate means each communicating with one of said inlet portions in a direction generally normal to said intermediate plate means, a plurality of outlet means in said second end plate means each communicating with one of said outlet portions in a direction generally normal to said intermediate plate means.

References Cited by the Examiner

UNITED STATES PATENTS

| | | | |
|---|---|---|---|
| 2,792,804 | 5/57 | Bouyoucos et al. | 116/137 |
| 2,804,042 | 8/57 | Gavreau | 116/137 |
| 3,071,145 | 1/63 | Blanchard | 134/122 |

WALTER A. SCHEEL, *Primary Examiner.*

LEO QUACKENBUSH, *Examiner.*